United States Patent [19]

Biszantz et al.

[11] 4,256,156
[45] Mar. 17, 1981

[54] MULTI-TENSION HACKSAW

[75] Inventors: Donald W. Biszantz, Loveland; Russell H. Landers, Hillsboro; James H. Sexton, Bainbridge, all of Ohio; Dominic J. Iammarino, St. Joseph, Mich.

[73] Assignee: Easco Tools, Inc., Glen Burnie, Md.

[21] Appl. No.: 54,718

[22] Filed: Jul. 5, 1979

[51] Int. Cl.³ .............................................. B27B 21/02
[52] U.S. Cl. .................................. 145/33 A; 145/35 E
[58] Field of Search .................. 145/33 R, 33 A, 35 E

[56] References Cited

U.S. PATENT DOCUMENTS

| 1,252,424 | 1/1918 | Gamage | 145/33 A |
| 1,394,174 | 10/1921 | Ireland et al. | 145/33 R |
| 1,710,549 | 4/1929 | Mungo | 145/33 R |
| 2,166,446 | 7/1939 | Priest et al. | 145/33 R |
| 2,516,079 | 7/1950 | Shortell | 145/33 R |
| 2,796,098 | 6/1957 | Dreier | 145/33 R |
| 2,869,600 | 1/1959 | Dreier | 145/33 R |
| 3,636,997 | 1/1972 | Keymer | 145/33 A |
| 3,822,731 | 7/1974 | Keymer | 145/33 A |

FOREIGN PATENT DOCUMENTS

| 2344366 | 10/1977 | France | 145/33 A |
| 425373 | 9/1947 | Italy | 145/33 A |

Primary Examiner—Othell M. Simpson
Assistant Examiner—J. T. Zatarga
Attorney, Agent, or Firm—Vogel, Dithmar, Stotland, Stratman & Levy

[57] ABSTRACT

A multi-tension hacksaw including a longitudinallly extending frame member having a first blade support member on one end and a bracket on the other end extending laterally therefrom a second blade support member pivotally mounted on the bracket, a tensioning rod having a threaded first end adjacent to the first blade support member and a second end pivotally connected to the second blade support member, an elongated crank handle threadedly and rotatably engaging the threaded first end of the tensioning rod so that rotation of the crank handle applies tension to the tensioning rod, and a tension indicator including a pointer mounted on the bracket and a tension indicia on the second blade support member cooperating with the pointer.

14 Claims, 6 Drawing Figures

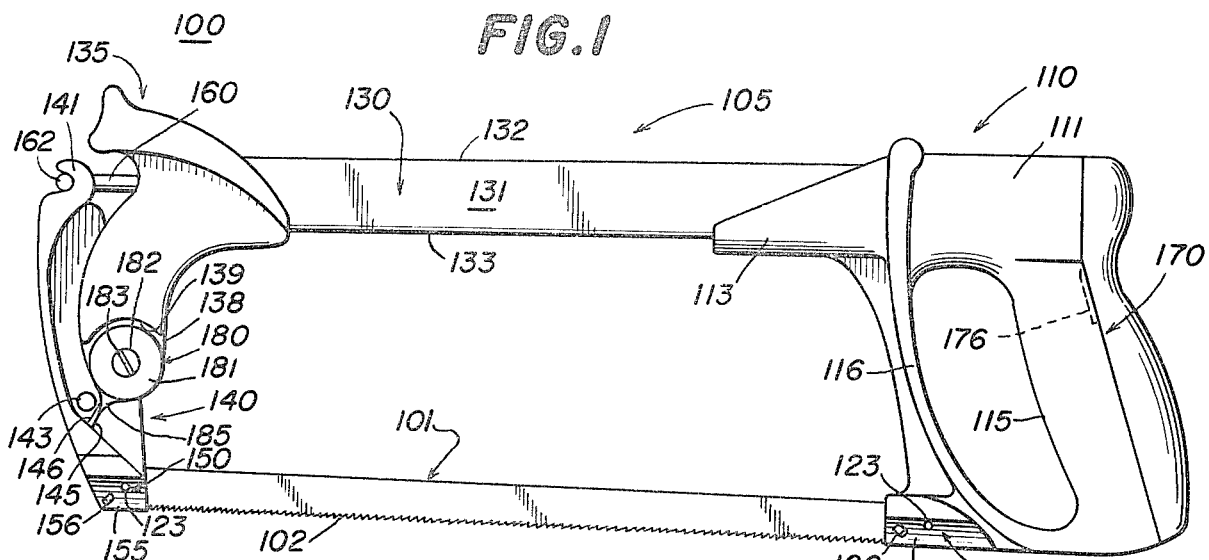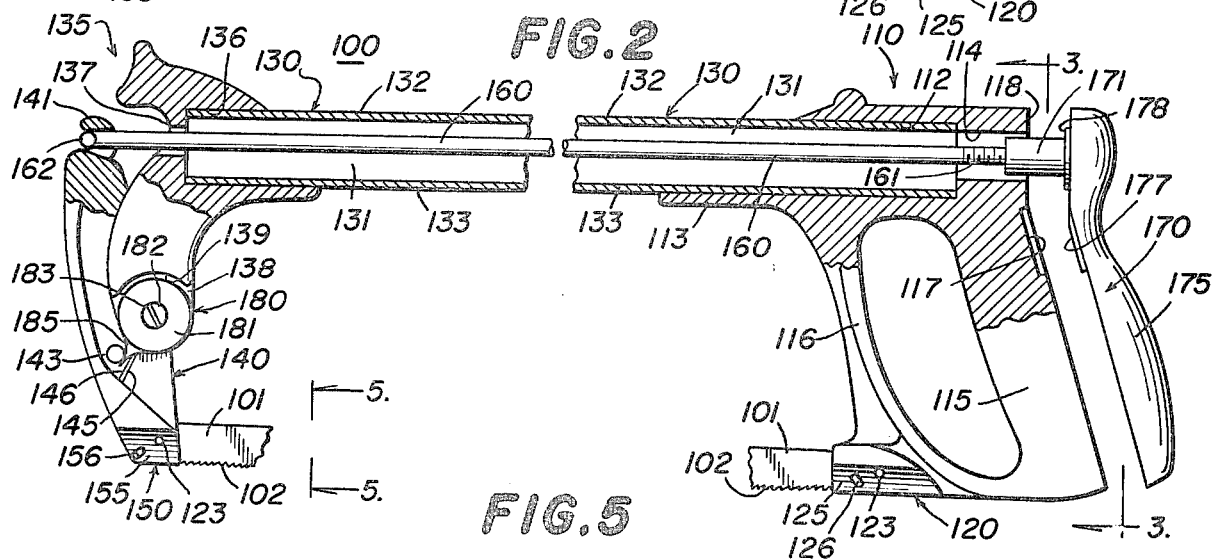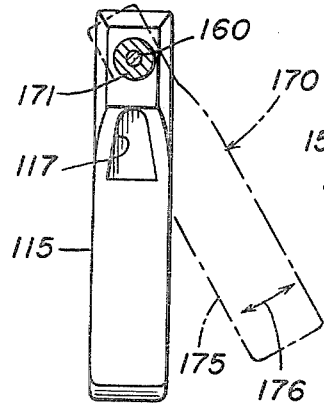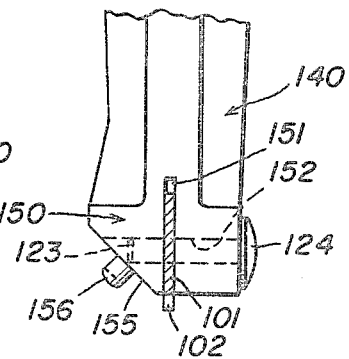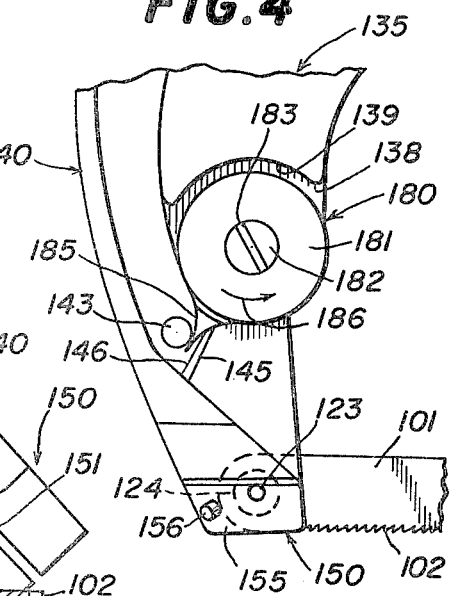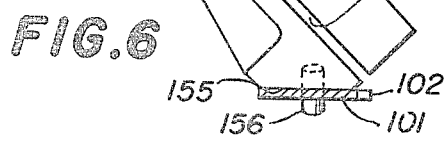

MULTI-TENSION HACKSAW

PRIOR ART STATEMENT AND BACKGROUND OF THE INVENTION

The present invention relates generally to hacksaws, and specifically to hacksaws that can effectively mount high speed blades requiring a lesser tension and bimetal blades requiring a much higher tension in the blade.

There recently have become available bimetal blades for hacksaws which require substantially higher tensions for effective operation than the standard high speed blades for hacksaws generally used heretofore, the bimetal blades requiring tensions on the order of 40,000 p.s.i. Hacksaw constructions available heretofore have not offered sufficient mechanical advantage in the blade tensioning mechanism to provide tensions of this order of magnitude.

The prior blade tensioning mechanisms for hacksaws are illustrated by the Keymer U.S. Pat. No. 3,636,997 granted Jan. 25, 1972. In this patent, the lever 78 forms a portion of the handle 14 and is used to apply tension to the blade 26. The lever 78 does not give a high tension in the blade, but rather permits the blade to be placed in either a tensioned or untensioned condition, there being no suggestion of progressively tensioning the blade in order to obtain a high mechanical advantage and resultant capability of high tension in the blade.

Other patents showing cranks and levers in the blade tensioning mechanism are the Glenn U.S. Pat. No. 2,725,911 granted Dec. 6, 1955, the Lorusso U.S. Pat. No. 2,034,625 granted Mar. 17, 1936 and the Thompson U.S. Pat. No. 1,446,674 granted Feb. 27, 1923. None of these patents show a progressive tensioning of the blades so as to achieve high tensions therein.

Patents showing progressive tensioning of the hacksaw blade are the Dreier U.S. Pat. No. 2,796,098 granted June 18, 1957, the Dreier U.S. Pat. No. 2,808,086 granted Oct. 1, 1957 and the Dreier U.S. Pat. No. 2,869,600 granted Jan. 20, 1959. Each of these patents shows the use of a knurled knob in order to apply tension to the hacksaw blade. The knurled knobs illustrated do not provide sufficient mechanical advantage adequately to tension blades such as bimetal blades to the required operating tension.

Furthermore, none of the patents noted above have any means for indicating the tension applied to the hacksaw blade. This is important when utilizing different types of hacksaw blades requiring different tensions, thus to ensure that the proper tension is applied to each blade encountered during the use of the hacksaw.

SUMMARY OF THE INVENTION

The present invention provides an improved hacksaw which is designed to be capable of utilizing effectively both high speed blades and bimetal blades that require a substantially greater tension therein, and there also is provided a tension indicator so as to ensure that the proper tension is applied to each blade utilized in the hacksaw.

This is accomplished in the present invention, and it is an object of the present invention to accomplish these desired results, by providing a multi-tension hacksaw comprising a longitudinally extending frame member, a first blade support member extending laterally from the frame member adjacent to one end thereof and fixedly attached thereto, a second blade support member extending laterally from the frame member adjacent to the other end thereof and pivotally attached thereto, a tensioning rod having a threaded first end adjacent to the first blade support member and a second end pivotally connected to the second blade support member, and an elongated crank handle adjacent to the first blade support member for reacting thereagainst and threadedly and rotatably engaging the threaded first end of the tensioning rod to apply a high tension thereto and in turn to apply a high tension to a bimetal blade mounted between the blade support members.

Another object of the invention is to provide a multi-tension hacksaw of the type set forth, wherein a bracket extends laterally from the frame member adjacent to the other end thereof and the second blade support member is pivotally mounted on the bracket, and a tension indicator including a pointer is mounted on either the bracket or the second blade support member and tension indicia are mounted on the other of the bracket or the second blade support member and cooperate with the pointer to indicate the tension in the blade mounted on the blade support members.

Further features of the invention pertain to the particular arrangement of the parts of the hacksaw, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 1 is a side elevational view of a preferred embodiment of a hacksaw made in accordance with and embodying the principles of the present invention, the hacksaw having a bimetal blade mounted thereon and in the tensioned condition thereof;

FIG. 2 is a fragmentary view similar to FIG. 1 with certain portions broken away and illustrating the hacksaw blade in the non-tensioned condition thereof;

FIG. 3 is a sectional view along the line 3—3 of FIG. 2;

FIG. 4 is a fragmentary enlarged view of a portion of the bracket and the second blade support member and the tension indicator mounted thereon, the parts being showed in the non-tensioned condition;

FIG. 5 is an enlarged fragmentary view in section along the line 5—5 of FIG. 2 showing the blade aligned in the plane of the hacksaw frame; and FIG. 6 is a view similar to FIG. 5 and showing the hacksaw blade disposed at an angle of 45° with respect to the plane of the hacksaw frame.

DESCRIPTION OF THE PREFERRED EMBODIMENT

Referring to FIG. 1 of the drawings, there is illustrated a hacksaw or hand saw 100 made in accordance with and embodying the principles of the present invention, the hacksaw 100 comprising a frame generally designated by the numeral 105 holding a blade 101 in the proper tensioned condition, the blade 101 being provided with the usual cutting teeth 102 and an opening adjacent to each end thereof for receiving a mounting pin, all as will be explained more fully hereinafter. The frame 105 in turn comprises a handle generally designated by the numeral 110 and which also comprises a blade support member, a blade support 120 mounted adjacent to the lower end of the handle as viewed in FIG. 1, a frame member in the form of a hollow tube 130 carrying the handle 110 at one end and a bracket 135 at the other end, the bracket 135 pivotally mounting thereon a second blade support member in the form of an arm or lever 140 that carries at the lower end thereof a second blade support 150.

The handle 110 is preferably formed as a casting and one end of the hollow tube 130 is received in a barrel 111 at the upper end of the handle 110, the barrel 111 having a rectangular opening 114 therein which snugly receives the adjacent end of the hollow tube 130 and is fixedly secured thereto. A support flange 113 that is generally U-shaped in cross section extends to the left from the barrel 111 and serves further to support the underside of the hollow tube 130. Referring to FIG. 2 also, it will be seen that a cylindrical opening 114 extends from the right-hand end of the handle 110 to join the rectangular opening 112 to receive a portion of the tensioning mechanism to be described more fully hereinafter. The handle 110 also includes a handgrip 115 depending from the barrel 111 and a finger guard 116 spaced from the handgrip 115 so that the user's fingers may be disposed in the opening therebetween. There also is provided in the right-hand end of the handgrip 115 a recess 117 forming a part of a detent structure to be described more fully hereinafter and a bearing surface 118.

The lower portion of the handle 110, and specifically the lower portion of the finger guard 116, carries a first blade support 120. The blade support 120 has a slot therein that receives the adjacent end of the blade 101 and also has a transverse hole that receives a pin 123, the hole 122 being aligned with the hole in the adjacent end of the hacksaw blade 101 so that the pin 123 passing through the aligned holes serves to attach the adjacent end of the hacksaw blade 101 to the first blade support 120. In order to assist in holding the pin 123 in the aligned holes, one end thereof carries an enlarged head 124. The slot in the blade support 120 is arranged in a plane defined by the hacksaw frame 105, more specifically by the mid-line of the hollow tube 130, the handle 110 and the bracket 135. In making certain cuts with the hacksaw 100, it is desired that the blade 101 be disposed at an 45° angle with respect to the plane defined by the hacksaw frame 105, and to that end a first blade support 120 is provided with a planar surface 125 that is disposed at a 45° angle with respect to the associated slot in the blade support 120. In order to mount a hacksaw blade 101 on the surface 125, a pin 126 is provided thereon, the pin 126 having the longitudinal axis thereof inclined to the right as viewed in FIGS. 1 and 2 at an angle of about 30°.

The hollow tube or frame member 130 is generally rectangular in cross section and includes parallel side walls 131, a top wall 132 disposed normal to the side walls 131 and a bottom wall 133 disposed parallel to the top wall 132 and normal to the side walls 131. Such a construction provides substantial strength for the hollow tube 130 to withstand the high tensions required in use of bimetal hacksaw blades. As has been described hereinabove, the right-hand end of the hollow tube 130 is received in the opening 112 in the handle barrel 111, the opening 112 being shaped complementary to the adjacent end of the hollow tube 130. The U-shaped support flange 113 extends forwardly from the barrel 111 and supports the lower portion of the hollow tube 130. Means (not shown) fixedly interconnects the handle 110 and the adjacent end of the hollow tube 130.

The other end of the hollow tube 130 carries the bracket 135, the bracket 135 having an opening 136 therein shaped complementary to the exterior cross section of the hollow tube 130 snugly to receive the adjacent end of the hollow tube 130 therein. Means (not shown) fixedly secures the bracket 135 to the adjacent end of the hollow tube 130. The bracket 135 extends laterally from the hollow tube 130 in the same direction as the handle 110 and carries at the lower end thereof spaced-apart flanges 138 that receive therebetween the right-hand edge of the arm or lever 140 intermediate the vertical extent thereof. A fastener (not shown) pivotally interconnects the bracket 135 and the arm 140 so as pivotally to mount the arm 140 upon the bracket 135. The upper end of the arm 140 has a hook 141 for cooperation with tensioning structure to be described more fully hereinafter, and carries on the lower end thereof a second blade support 150. As is best seen in FIGS. 5 and 6, the blade support 150 has a slot 151 therein that lies in the same plane as that defined by the hacksaw frame 105 and is in longitudinal alignment with the corresponding slot in the blade support 120. A hole 152 extends through the blade support 150 and the slot 151 and is adapted to be aligned with a corresponding hole in the adjacent end of the hacksaw blade 101. One of the pins 123 having a head 124 on one end thereof is adapted to extend into and through the hole 152 and the aligned hole in the adjacent end of the hacksaw blade 101, thus to secure the adjacent end of the hacksaw blade 101 to the blade support 150. The blade support 150 is also provided with the surface 155 that is disposed at an angle of about 45° with respect to the plane of the slot 151. Extending from the surface 155 is a blade mounting pin 156 that is inclined to the left as viewed in FIG. 1 at an angle of about 30°. The pin 156 on the blade support 150 in cooperation with the pin 126 on the blade support 120 can mount the hacksaw blade 101 against the surfaces 155 and 125, respectively, thus to mount the plane of the hacksaw blade 101 at an angle of 45° with respect to the plane defined by the hacksaw frame 105.

Tensioning mechanism for tensioning the hacksaw blade 101 upon the frame 105 is provided by a tensioning rod 160 and a tensioning lever or crank handle 170. As is best seen in FIG. 2, the tensioning rod 160 extends through the hollow tube 130 to be protected thereby and has at one end thereof threads 161 disposed essentially in the cylindrical opening 114 in the handle 110, and a cross bar 162 on the other end thereof engaging the hook 141 on the arm 140. It is noted that the left-hand end of the tensioning rod 160 extends through a hole 137 in the bracket 135 at the other end thereof. In order to apply a tensioning force to the tensioning rod 160, the tensioning lever 170 is provided having a cylindrical portion 171 with a threaded opening therein that threadedly receives the threads 161 on the tensioning rod 160. It is also pointed out that the tensioning lever 170 has an enlongated handle portion 175 which is long enough to provide substantial mechanical advantage for the user during the tensioning operation, and further that the threads 161 on the tensioning rod 160 and the mating threads in the tensioning lever 170 likewise provide substantial mechanical advantage for the tensioning operation. As is diagrammatically illustrated in FIG. 3, rotation of the tensioning lever 170 serves to apply tension to the rod 160 or to relieve tension therein, rotation in the direction of the arrow 176 in a clockwise direction applying tension to the rod 160 and rotation in a counterclockwise direction relieving tension in the rod 160. In order to hold the tensioning lever 170 in the adjusted position thereof with respect to the handle 110, detent structure has been provided including the recess 117 in the handle 110 and a projection 177 on the tensioning lever 170 adapted to extend into and cooperate with the recess 117. A bearing member 178 surrounds the portion 171 and bears against the bearing surface 118 during the tensioning operation. It is pointed out that when the parts are in the tensioned condition as illustrated in FIG. 1, the tensioning lever 170 forms a smooth continuation of the handle 110 to form a part of the handgrip portion available to the user of the hacksaw 100.

In order to provide the necessary strength to impart the required tension to bimetal hacksaw blades, the frame member 130 is formed of cold rolled steel and has a wall thickness of about $\frac{1}{8}$". The handle 110, the bracket 135, the arm 140 and the tensioning lever 170 are all formed of cast aluminum, the preferred material being 2024 aluminum. The tensioning rod 160 is formed of mild steel having a diameter of about $\frac{1}{4}$" and the threads 161 are $\frac{1}{4}$-20 N.C. The pins 123 are formed of drill rod with a hardness of Rockwell C 58-60 and have a diameter of 0.14".

It is desirable for the user to be able to set the required tension dependent upon whether a high speed hacksaw blade or a bimetal hacksaw blade is being used in the hacksaw 100. It is undesirable to impart too great a tension to the high speed blade, and conversely it is necessary to impart the required high tension in the order of 40,000 p.s.i. to a bimetal blade if the advantages of the bimetal blade are to be fully realized. To this end, a tension indicator 180 has been provided. The bracket 135 has a recess 139 in one side thereof that receives therein a circular plate 180 carrying a pointer 185 extending from the periphery thereof. The center of the plate 180 has an opening receiving a screw 182 carrying a slot 183 therein for receiving the usual screwdriver blade, the screw 182 adjustably mounting the plate 180 upon the bracket 135. Disposed on the arm 140 is a stop 143 and two tension indicia in the form of a first line 145 and a second line 146 inscribed thereon. The lines 145 and 146 are radii from the center of the screw 182 and are disposed respectively 37° and 40° away from a vertical line through the center of the screw 182. When the pointer 185 reaches the line 145, a proper tension has been imparted to a bimetal blade, i.e., tension of about 40,000 p.s.i. When the pointer 185 is at the line 146, a proper tension has been imparted for a high speed hacksaw blade. The tension indicator 180 is adjusted by first placing a blade 101 in the blade supports 120 and 150. With no tension applied, the screw 182 is loosened and the circular plate 181 rotated until the pointer 185 is disposed against the stop 143; the screw 182 is then tightened so as to fix the position of the circular plate 181 with respect to the bracket 135.

The description of the use of the hacksaw 100 will now be given. Assuming that a high speed hacksaw blade 101 is to be mounted on the frame 105 in the position such that the plane of the blade 101 lies in the plane of the frame 105, the tensioning lever 170 is first threadedly moved to the position illustrated in FIG. 2. Two of the pins 123 are provided and the ends of the hacksaw blade 101 are mounted in the blade supports 120 and 150 by inserting the ends of the blade in the respective slots and inserting the pins 123 through the aligned holes in the blade supports and the hacksaw blade 101. If necessary, the tension indicator is adjusted so as to place the pointer 185 against the stop 143 by loosening the screw 182 and moving the circular plate 181 to the proper position with the pointer against the stop 143, all as is illustrated in FIGS. 2 and 4 of the drawings. With the hacksaw blade 101 mounted in the non-tensioned condition, the tensioning lever 170 is then rotated in a clockwise direction as is diagrammatically illustrated by the arrow 176 in FIG. 3. The threads 161 on the tensioning rod 160 will be drawn into the internally threaded cylindrical portion 171 on the tensioning lever 170, and thus pull the tensioning rod 160 to the right as viewed in FIG. 2, the bearing member 178 rotatably bearing against the bearing surface 118. The cross bar 162 engaging the hook 141 on the arm 140 will pivot the arm 140 about the longitudinal axis of the screw 182 in a clockwise direction, thus moving the blade support 150 to the left with respect to the blade support 120 and thus progressively to apply tension to the hacksaw blade 101 connected therebetween. As tension is imparted to the hacksaw blade 101, the pointer 185 as viewed in FIG. 4 will move in a counterclockwise direction diagrammatically illustrated by the arrow 186 and toward the inscribed line 146. When the pointer 185 reaches the line 146, the proper tension will have been imparted to the hacksaw blade 101 for a high speed hacksaw blade. The projection 177 on the tensioning lever 170 is placed in the recess 117 on the handle 110 so as to position the parts with respect to one another. The hacksaw 100 is now ready for use and the proper tension will have been imparted to the high speed blade 101 mounted thereon.

If it is desired to position the blade 101 at an angle of 45° with respect to the plane of the hacksaw frame 105, then the handle portion 175 of the tensioning lever 170 is rotated in a counterclockwise direction so as to remove the tension from the blade 101, after which the pins 123 may be removed and the blade 101 positioned with the openings in the ends thereof receiving and engaging the pins 126 and 156, respectively. The handle portion 175 of the tensioning lever 170 is then moved and rotated in a clockwise direction as viewed in FIG. 3 to tension the hacksaw blade 101 in the new position thereof. More specifically, the tensioning lever 170 is rotated until the pointer 185 reaches the inscribed line 146, see FIG. 4 particularly. The projection 177 is moved to the recess 117 so as to hold the tensioning lever 170 in cooperating operative position with the handle 110.

If it is desired to use a bimetal hacksaw blade in the hacksaw frame 105, the blade 101 is mounted as described above with respect to a high speed blade. The tensioning lever 170 is then rotated in a clockwise direction as viewed in FIG. 3 so as to apply tension to the rod 160 which in turn through the arm 140 applies tension to the hacksaw blade 101. Because of the elongated handle portion 175 on the tensioning lever 170, and because of the threaded interconnection between the tensioning rod 160 and the tensioning lever 170, the user has sufficient mechanical advantage to impart a high tension to the hacksaw blade 101, i.e., tension in the order of about 40,000 p.s.i. The user is apprised of reaching this tension by watching the pointer 185 which will move to the inscribed line 145 when the necessary tension for a bimetal hacksaw blade has been achieved. After the pointer 185 moving in the direction of the arrow 186 reaches the inscribed line 145, the user places the projection 177 on the tensioning lever 170 in the recess 117 in the handle 110, thus to hold the handle 110 and the tensioning lever 170 in the desired cooperating position for ease of use of the hacksaw 100 by the user.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A multi-tension hacksaw for utilizing both bimetal blades and high speed blades comprising a longitudinally extending hollow frame member, a first blade support member extending laterally from said frame member adjacent to one end thereof and fixedly attached thereto, a second blade support member extending laterally from said frame member adjacent to the other end thereof and pivotally attached thereto, a tensioning rod extending through said hollow frame member and having a threaded first end adjacent to said first blade support member and a second end pivotally connected to said second blade support member, and an elongated crank handle adjacent to said first blade support member for reacting thereagainst and threadedly and rotatably engaging the threaded first end of said tensioning rod to apply a high tension thereto and in turn to apply a high tension to a bimetal blade mounted between said blade support members.

2. The multi-tension hacksaw set forth in claim 1, wherein said frame member is a hollow tube.

3. The multi-tension hacksaw set forth in claim 2, wherein said hollow tube is rectangular in cross section.

4. The multi-tension hacksaw set forth in claim 1, wherein said first blade support member includes a handgrip portion.

5. The multi-tension hacksaw set forth in claim 1, and further comprising detent structure between said first blade support member and said crank handle to hold said crank handle in the desired adjusted position thereof.

6. The multi-tension hacksaw set forth in claim 1, wherein said frame member and said blade support members define the longitudinal plane of said hacksaw, said blade support members including structure to support a blade therebetween lying in said longitudinal plane and support structure to hold a blade therebetween at an angle of 45° to said longitudinal plane.

7. The multi-tension hacksaw set forth in claim 1, wherein said frame member and said support members and said tensioning rod accommodate a tension of 40,000 p.s.i. in a bimetal blade supported between said blade support members upon operation of said elongated crank handle.

8. A multi-tension hacksaw for utilizing both bimetal blades and high speed blades comprising a longitudinally extending frame member, a first blade support member extending laterally from said frame member adjacent to one end thereof and fixedly attached thereto, a bracket extending laterally from said frame member adjacent to the other end thereof and in the same direction as said first blade support member and fixedly attached thereto, a second blade support member pivotally mounted on said bracket and extending therefrom in the same direction as said first blade support member, a tensioning rod having a threaded first end adjacent to said first blade support member and a second end pivotally connected to said second blade support member, an elongated crank handle adjacent to said first blade support member for reacting thereagainst and threadedly and rotatably engaging the threaded first end of said tensioning rod, rotation of said crank handle with respect to said first blade support member and said tensioning rod applying tension thereto and said elongated crank handle permitting the user to apply a high tension thereto and to a bimetal blade mounted between said blade support members, and a tension indicator including a pointer mounted on one of said bracket and said second blade support member and tension indicia mounted on the other of said bracket and said second blade support member and cooperating with said pointer to indicate the tension in the blade mounted on said blade support members.

9. The multi-tension hacksaw set forth in claim 8, wherein said frame member is a hollow tube and said tensioning rod extends therethrough and is protected thereby.

10. The multi-tension hacksaw set forth in claim 8, wherein said first blade support member includes a handgrip portion.

11. The multi-tension hacksaw set forth in claim 8, and further comprising detent structure between said first blade support member and said crank handle to hold said crank handle in the desired adjusted position thereof.

12. The multi-tension hacksaw set forth in claim 8, wherein said pointer is mounted on said bracket and said tension indicia are mounted on said second blade support member.

13. The multi-tension hacksaw set forth in claim 8, and further comprising a stop on said second blade support member, said pointer being adjustably mounted on said bracket and adjustable by the user to be positioned against said stop when there is no tension in a blade supported between said blade support members, said tension indicia being on said second blade support member spaced from said stop so as to indicate the tension in a blade mounted between said blade support members as said crank handle threadedly engages said tensioning rod to tension the associated blade.

14. The multi-tension hacksaw set forth in claim 8, wherein said pointer is mounted on said bracket, and said tension indicia are two lines inscribed on said second blade support member respectively indicating the proper tension for a bimetal blade and a high speed blade.

* * * * *